United States Patent [19]
Deno

[11] Patent Number: 5,806,730
[45] Date of Patent: Sep. 15, 1998

[54] HOLDER FOR CONTAINER AND OTHER ARTICLES

[76] Inventor: Sharon A. Deno, 22340 S. Joseph Ave., Channahon, Ill. 60410

[21] Appl. No.: 743,770

[22] Filed: Nov. 7, 1996

[51] Int. Cl.⁶ .............................. A45F 5/00; B62J 11/00
[52] U.S. Cl. ..................... 224/148.6; 224/579; 224/250; 224/426; 224/926
[58] Field of Search .................................... 224/519, 584, 224/563, 250, 926, 148.5, 148.6, 148.7, 675, 426

[56] References Cited

U.S. PATENT DOCUMENTS

| | | | |
|---|---|---|---|
| 5,174,483 | 12/1992 | Moore, IV et al. | 224/250 |
| 5,505,353 | 4/1996 | Marsh, Jr. | 224/148.6 |
| 5,535,928 | 7/1996 | Herring | 224/250 |

*Primary Examiner*—Renee S. Luebke
*Attorney, Agent, or Firm*—Ernest Kettelson

[57] ABSTRACT

A holder for a container and other articles comprises a plurality of flexible retaining strips which can be formed in laterally extending loops to define a peripheral side wall of the holder cavity and in a longitudinal extending loop to define the bottom wall of the cavity. The ends of the loops are releasably secured together by Velcro type hook and loop elements which are releasably interconnectable. A longitudinal retaining strip extends upwardly from the cavity of the holder to form a waistbelt receiving loop. A short lateral strip is provided near the upper end of such longitudinal retaining strip to form a laterally extending loop which can receive an upwardly extending portion of the frame of a bicycle or other vehicle on which the holder can be conveniently carried. The cross-sectional and longitudinal dimension of the cavity can be made larger or smaller to snugly receive and hold articles of differing lengths as well as differing cross-sectional dimensions.

3 Claims, 6 Drawing Sheets

HOLDER FOR CONTAINER AND OTHER ARTICLES

FIELD OF THE INVENTION

This invention relates to the field of holders for containers such as water bottles and other articles which can be carried by a person, such as connecting the holder to a person's waist belt for example, by securing to the frame of a bicycle or other vehicle, and the like.

BACKGROUND OF THE INVENTION

A number of holders for water bottles or canteens, for transistor radios, and other articles of that size are known to the prior art. Most of those holders are made for carrying a specific type of article, or for carrying articles of a particular size. The longitudinal and cross-sectional dimensions of such prior art holders cannot be made larger or smaller to snugly hold and snugly conform to different types of articles having different size widths and lengths, as well as different shapes.

Prior art holders of which the inventor is aware include those shown and described in the following U.S. Pat. Nos. 5,535,928; No. 5,505,353; No. 5,325,991; No. 5,163,591; No. 5,048,734; No. 4,951,910; No. 4,915,337. Copies of such patents and the prior art holders disclosed therein are readily available to the public.

SUMMARY OF THE INVENTION

The holder for a container and other articles in accordance with this invention comprises a plurality of flexible retaining strips which can be assembled to form a holder having a cavity with a peripheral side wall composed of spaced apart lateral strips forming a loop around the cavity, and a bottom wall composed of longitudinal strips connected together at their lower end regions to form a bottom wall loop.

One of the longitudinal retaining strips extends upwardly from the open top wall of the cavity far enough for a doubled back portion to form a carrying loop for connecting to the waist band of a user. A separate laterally extending strip is also provided to form a second carrying loop whose through passageway extends in a direction ninety degrees from that of the through passageway of the waist belt carrying loop. The second carrying loop is convenient for connecting the holder to the frame of a bicycle or other vehicle.

The retaining strips have releasable securing means extending inwardly from their ends, which releasably secure the ends together to form the lateral and longitudinal loops that define the cavity of the holder, and also to form the carrying loops by which the holder can be carried on a person's waist belt or on the frame of a bicycle or other vehicle.

The releasable securing means of the preferred embodiment as described in more detail hereinbelow comprises hook and loop elements which releasably interconnect.

The lateral and longitudinal loops that define the cavity can be made larger or smaller, whereby the cross-section of the cavity can be expanded to snugly receive and hold an article of relatively large width or cross-sectional dimension, and contracted to just as snugly receive and hold an article of relatively smaller width or cross-sectional dimension.

The longitudinal loop formed by the longitudinal retaining strips to provide a bottom wall of the cavity can also be made larger or smaller to conform to the length of larger and smaller articles.

The holder in accordance with this invention is made entirely of non-metallic material.

DESCRIPTION OF THE PREFERRED EMBODIMENT

Figure 1:
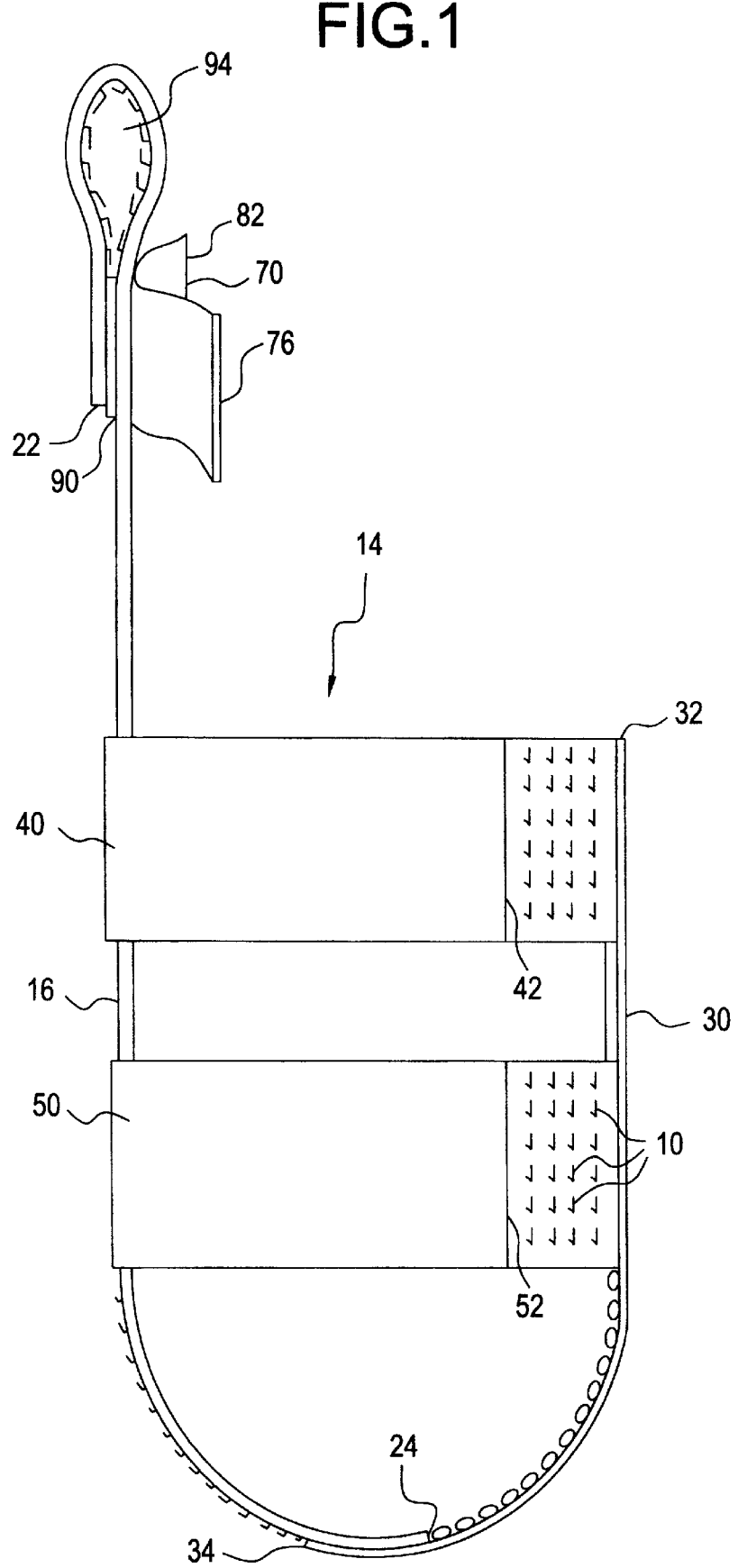
FIG. 1 is an elevation view of a holder for a container or other article in accordance with this invention.
Figure 2:
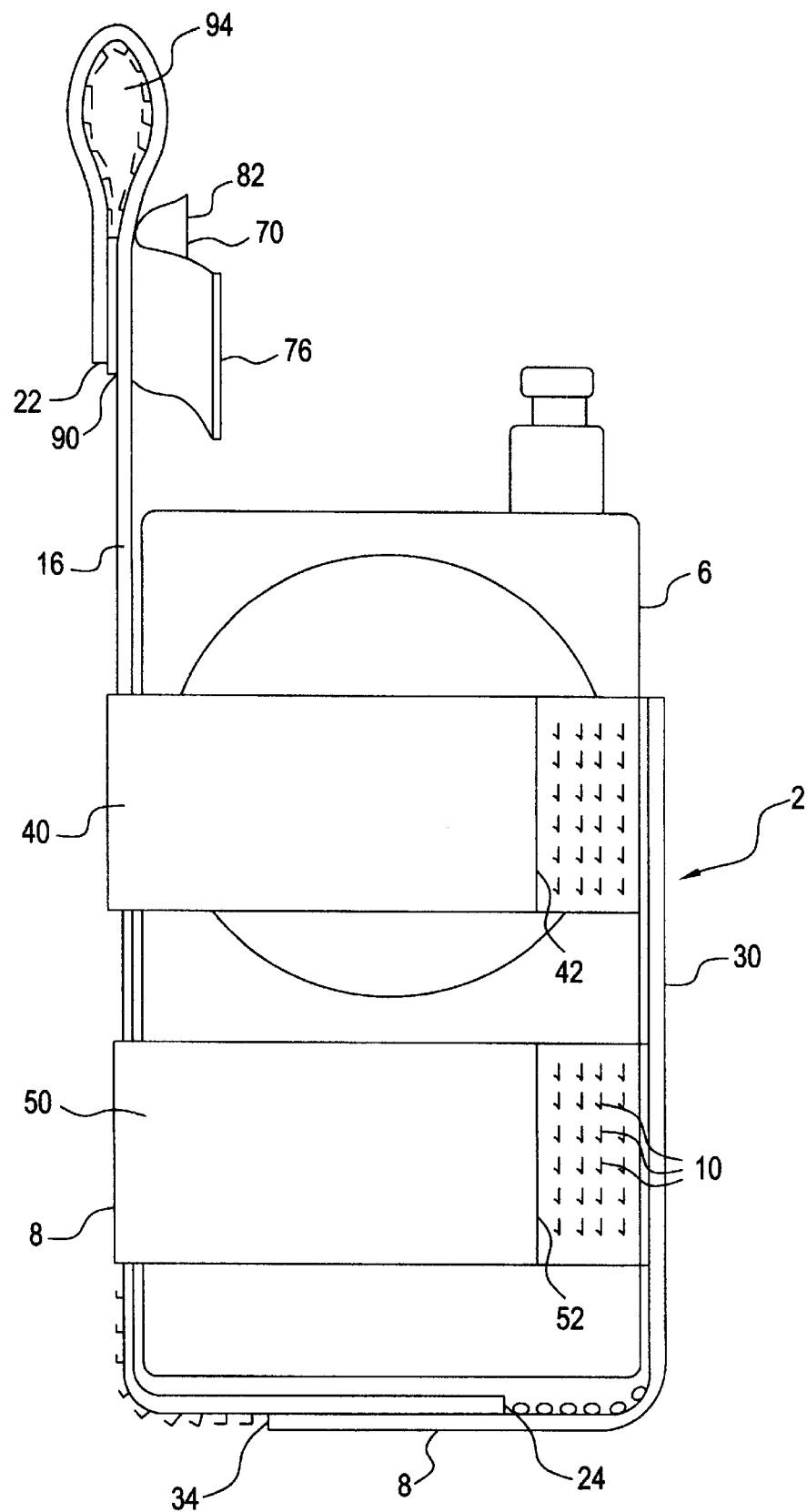
FIG. 2 is an elevation view of a holder as shown in FIG. 1 with a transistor radio shown held therein.
Figure 3:
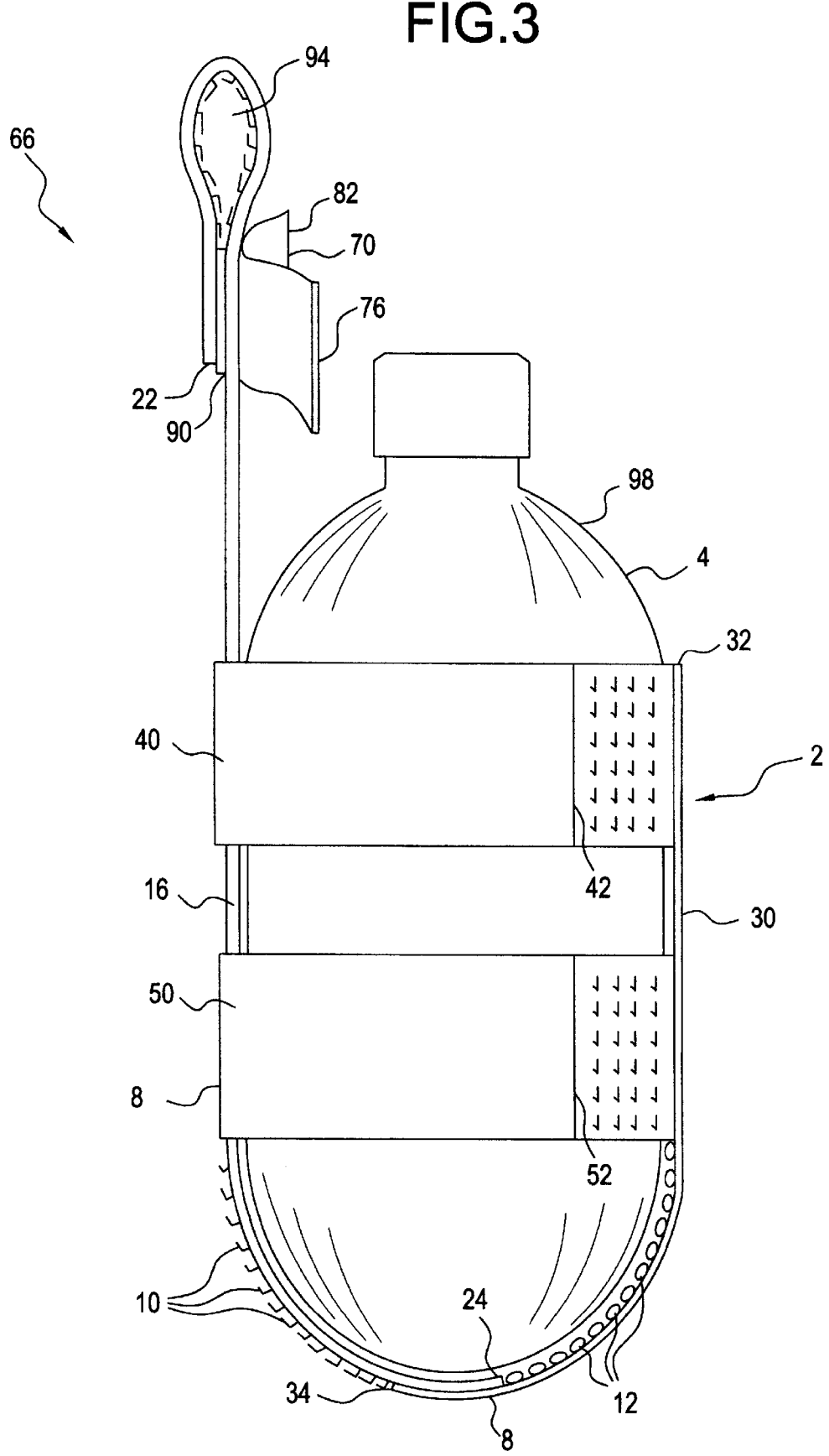
FIG. 3 is an elevation view of a holder as shown in FIG. 1 with a bottle shown held therein.
Figure 4:
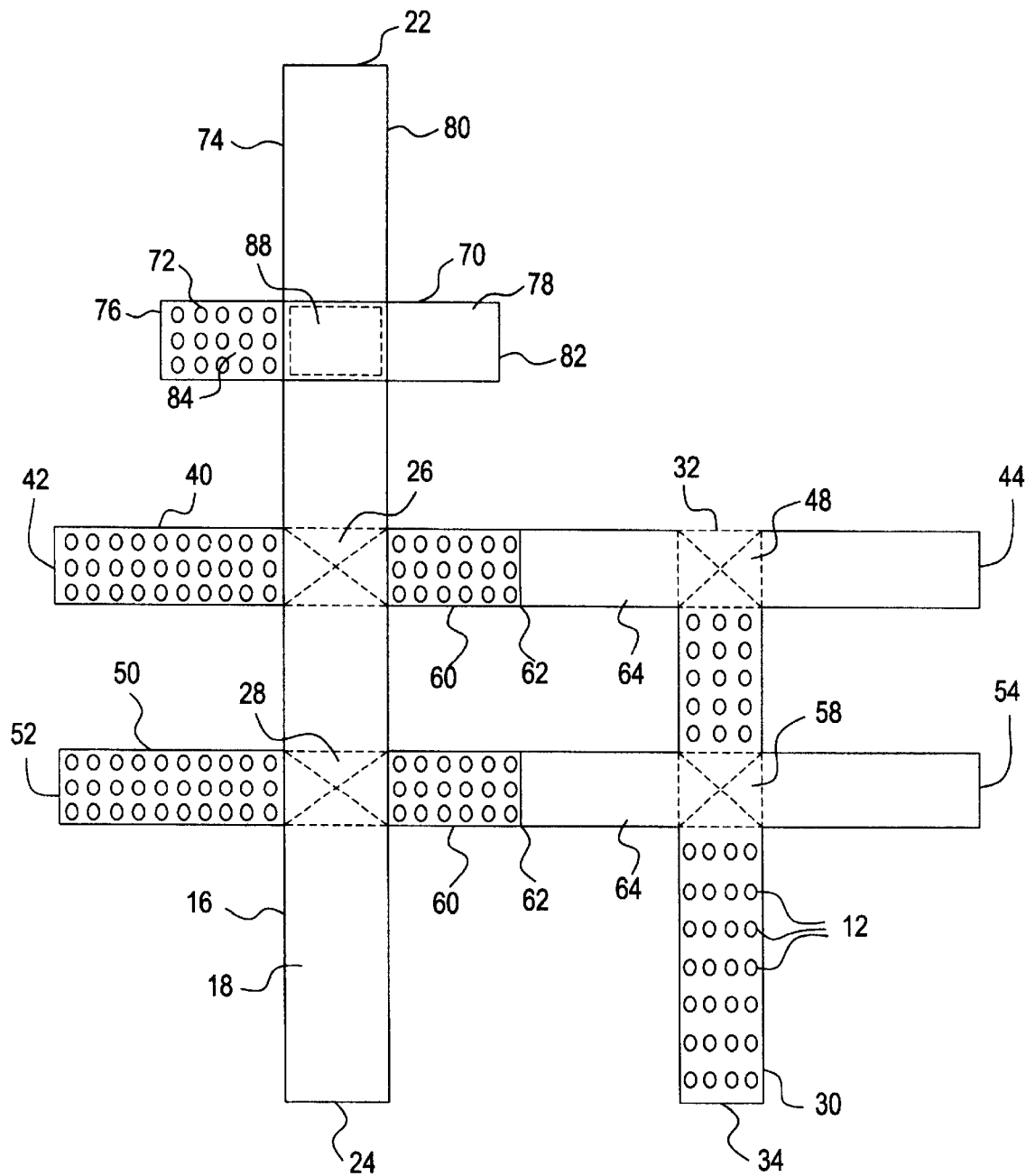
FIG. 4 is a plan view from one side of the holder in accordance with this invention shown in its disassembled form with the ends of its retaining strips disconnected.
Figure 5:
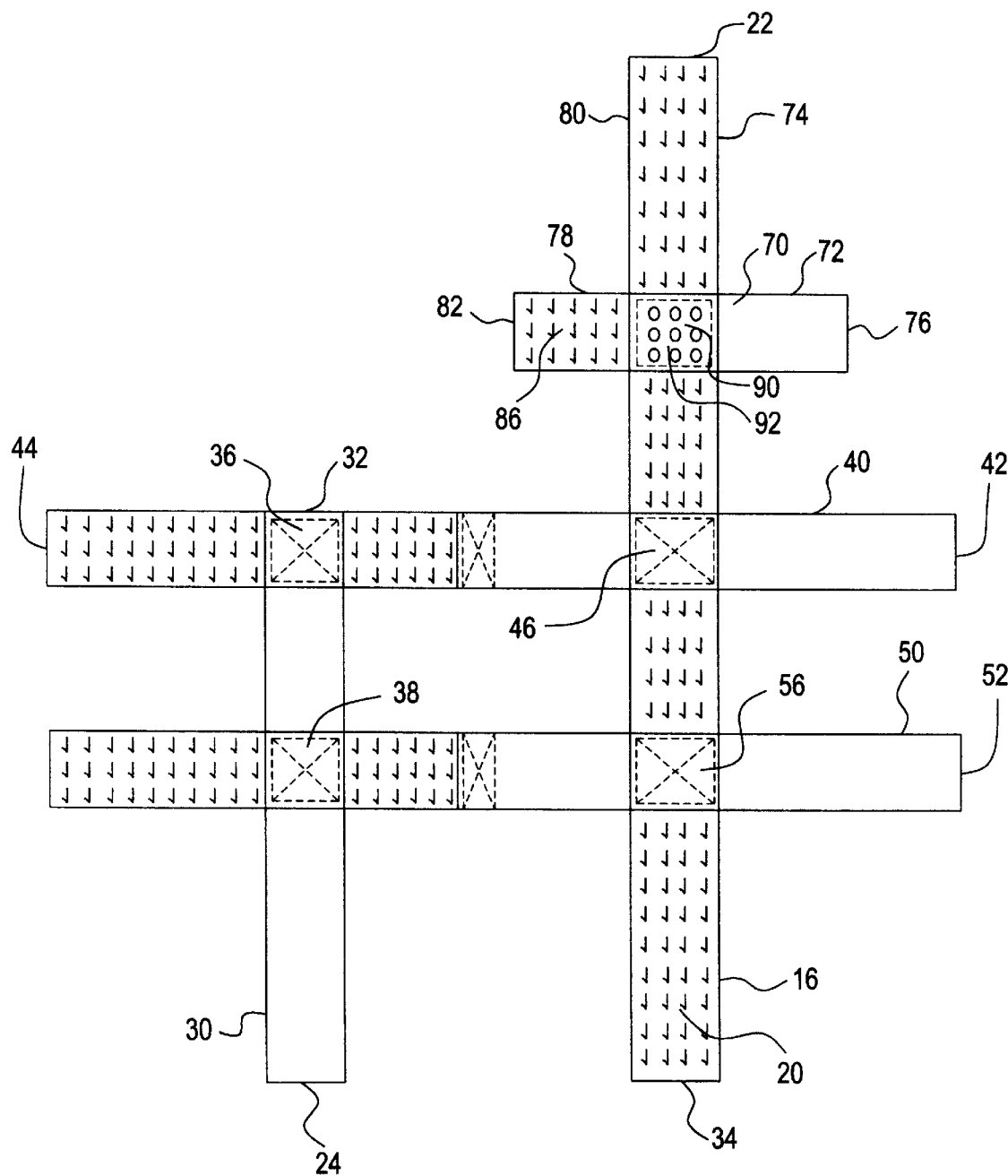
FIG. 5 is a plan view from the other side of the disassembled holder shown in FIG. 4.
Figure 6:
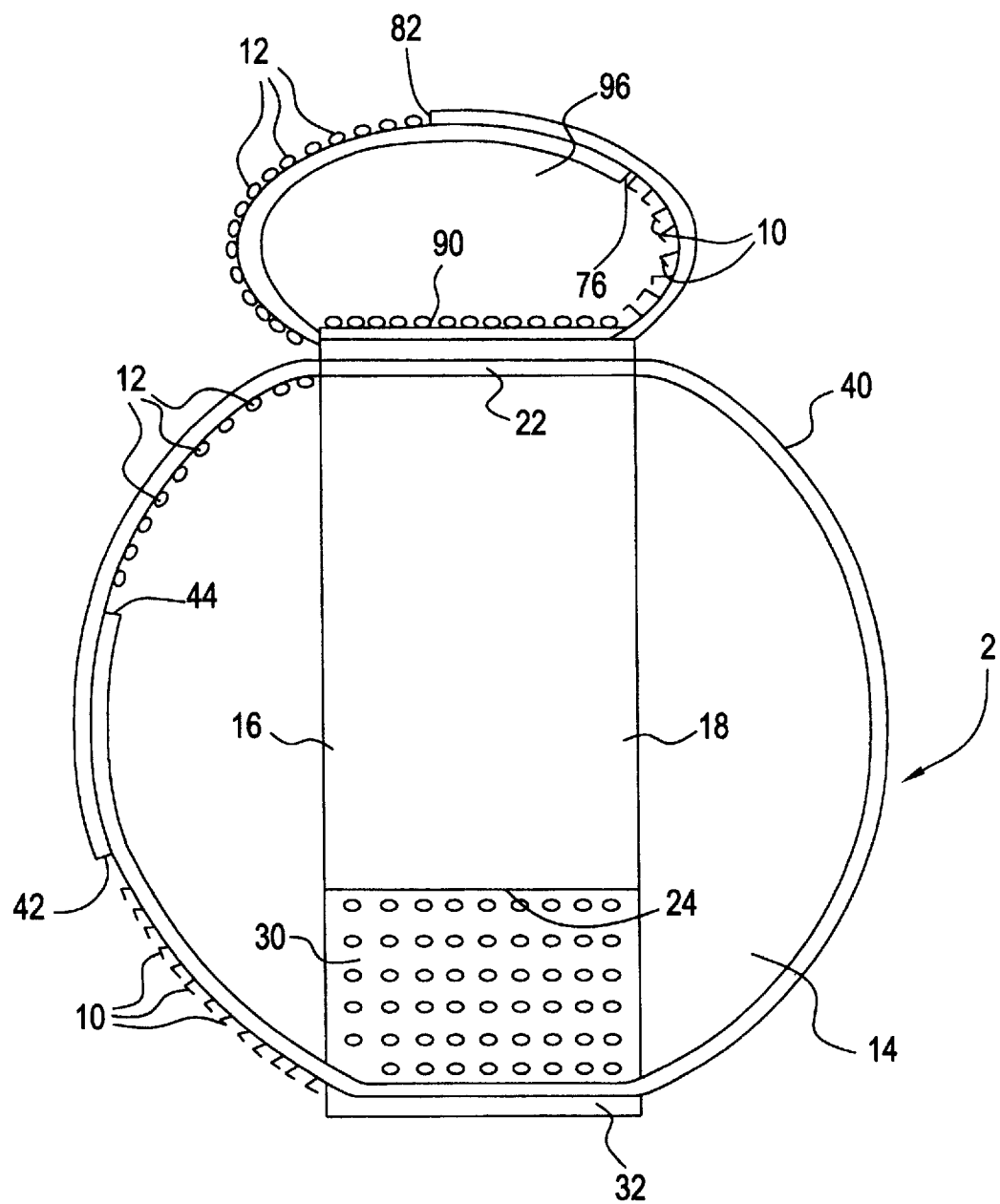
FIG. 6 is a top plan view of the holder in accordance with this invention shown in its assembled form and the ends of its retaining strips connected together.

A holder 2 for a container 4 and other articles such as a transistor radio 6, in accordance with the present invention comprises elongated retaining strips 8 of flexible sheet material having releasable fastening members such as tiny hook elements 10 and cooperative loop elements 12 at their end regions for securing together in a way to form the holder 2. The end regions of the strips 8 may be unfastened to dis-assemble the holder, to fold up for example in a small compact unit that can be put in the pocket of a pair of trousers, a shirt, in a purse or the like. The fastening elements 10 and 12 at the end regions of the strips 8 extend inwardly of the strips 8 a substantial distance to enable fastening the ends together at various points to make a larger or smaller cross-sectional cavity 14 to snugly hold containers or other articles of differing diameters or cross-sectional dimensions, and to also make a longer or shorter cavity 14 to hold containers and other articles that have differing lengths.

The particular embodiment of the invention shown and described herein includes a first more elongated longitudinal retaining strip 16 having an inwardly facing surface 18 which faces inwardly of the cavity 14 when the holder 2 is assembled, and an opposite outwardly facing surface 20. This more elongated retaining strip 16 has an upper or first end 22, a lower or second end 24, a first intermediate connecting section 26 about half way between the first end 22 and second end 24, and a second intermediate connecting section 28 located between the first intermediate section 26 and the second end 24.

The embodiment of the holder 2 shown and described herein includes a second shorter longitudinal retaining strip 30, which also has an inwardly facing surface 18 and an opposite outwardly facing surface 20. This shorter longitudinal retaining strip 30 has an upper or first end 32, a lower or second end 34, a first connecting section 36 extending inwardly from the first end 32, and a second connecting section 38 located between the first connecting section 36 and the second end 34 of this shorter longitudinal retaining strip 30.

In the embodiment shown and described herein, the outwardly facing surface 20 of the first more elongated retaining strip 16 is covered throughout with tiny hook elements 10 of the cooperative hook and loop fastening members. The inwardly facing surface 18 of shorter longitudinal strip 30 of the embodiment shown and described herein is covered throughout with tiny loop elements 12 of the cooperative hook and loop fastening members.

A first lateral retaining strip 40 has a first end 42, an opposite second end 44, a first connecting section 46 spaced apart inwardly from the first end 42, whose inner surface 18 is connected by sewing or other means to the outer surface 20 of the first connecting section 26 of the first more elongated longitudinal retaining strip 16 to extend laterally thereof, and a second connecting section 48 whose outer surface 20 is connected by sewing or other means to the inner surface 18 of the first connecting section 36 of the second and shorter longitudinal retaining strip 30 to extend laterally thereof. The connecting section 48 of the first lateral retaining strip 40 is spaced apart inwardly from the second end 44 thereof.

A second lateral retaining strip 50 has a first end 52, an opposite second end 54, a first connecting section 56 spaced apart inwardly from the first end 52, whose inner surface 18 is connected by sewing or other means to the outer surface 20 of the second connecting section 28 of the first more elongated longitudinal retaining strip 16 to extend laterally thereof, and a second connecting section 58 whose outer surface 20 is connected by sewing or other means to the inner surface 18 of the second connecting section 38 of the second and shorter longitudinal retaining strip 30 to extend laterally thereof. The connecting section 58 of the second lateral retaining strip 50 is spaced apart inwardly from the second end 54 thereof.

When connected as described, the longitudinal retaining strips 16 and 30 extend longitudinally in spaced apart relationship to each other, and the lateral retaining strips 40 and 50 extend laterally in spaced apart relationship to each other.

In the embodiment shown and described herein, the lateral retaining strips 40 and 50 include a first half length 60 extending inwardly from their respective first ends 42 and 52 to their mid-point 62 and a second half length 64 extending inwardly from their respective second ends 44 and 54 to their mid-point 62. Their first half lengths 60 have their inwardly facing surfaces 18 covered with tiny loop elements 12 of the cooperative fastening member. Their second half lengths 64 have their outwardly facing surfaces 20 covered with tiny hook elements 10 of the cooperative fastening member.

The holder 2 includes a carrier connecting structure 66 by which the holder 2 can be connected to the waistband belt or shoulder strap of a user. The carrier connecting structure 66 includes a relatively short lateral carrier connecting strip 70 which extends laterally in both directions from its connection by sewing or the like to the first more elongated longitudinal strip 16 a relatively short way inwardly from its first or upper end 22. The carrier connecting strip 70 includes a first carrier connecting strip length 72 which extends outwardly from one side edge 74 of the longitudinal strip 16 to terminate in a first end 76 of the carrier connecting strip 70, and a second carrier connecting strip length 78 which extends outwardly from the opposite side edge 80 of the longitudinal strip 16 to terminate in a second opposite end 82 of the carrier connecting strip 70.

The surface 84 of the first carrier connecting strip length 72 faces in the same direction as the inwardly facing surface 18 of the first longitudinal strip 16, and is covered throughout with tiny loop elements 12 of a cooperative hook and loop fastening member. The surface 86 of the second carrier connecting strip length 78 faces in the same opposite direction as the outwardly facing surface 20 of the first longitudinal strip 16, and is covered throughout with tiny hook elements of a cooperative hook and loop fastening member.

On the outwardly facing surface 20 of the first longitudinal strip 16 at the location of the connecting section 88 where the carrier connecting strip 70 is secured to the first longitudinal connecting strip 16, a connecting panel 90 is secured by sewing or other means having its outwardly facing surface 92 covered with tiny loop elements of a cooperative hook and loop fastening member. Such connecting section 88 and connecting panel 90 is located inwardly from the first or upper end 22 of the first longitudinal retaining strip 16 a distance equal to substantially twice the width of a belt that a workman would wear around his waist. When the upper end 22 of the first longitudinal retaining strip 16 is doubled back on itself in the direction to face the connecting panel 90, it then forms a loop having a through passageway of large enough dimension to receive such belt therethrough.

When the first or upper end 22 of the first longitudinal retaining strip 16 is double backed as described, the tiny hook elements 10 on its outwardly facing surface 20 come into interconnecting relationship with the tiny loop elements 12 on the outwardly facing surface of the connecting panel 90. The first or upper end 22 is thereby held to the connecting panel 90 and a belt receiving loop 94 is thereby formed to secure the holder to the waistband belt of a user for carrying the holder 2 and bottle or other article received in the holder.

The two lengths 72 and 78 of the carrier connecting strip 70 are brought together to form a shoulder strap receiving loop 96, by bringing the outer first and second ends 76 and 82 of strip 70 around to overlap, with the surface 84 of strip length 72 having the tiny loop elements 12 in facing relationship with the surface 86 of strip length 78 having the tiny hook elements thereon. The surfaces 84 and 86 are pressed together, with the tiny loop elements 12 and tiny hook elements 10 interconnecting to hold the strip lengths 72 and 78 releasably connected together to form the shoulder strap loop 96.

The retaining strips 8 of the holder 2 are brought together as follows to form the cavity 14 of a desired length and cross-section to receive an article therein such as a bottle 98.

The ends 42 and 44 of the lateral retaining strip 40 are brought around to form a first loop in front of the inwardly facing surface 18 of the first longitudinal retaining strip 16, with the tiny loop elements 12 on the inwardly facing surface 20 of the first half length 60 of lateral retaining strip 40 overlapping and interconnecting with the tiny hook elements 10 on the outwardly facing surface 18 of the second half length 64 of retaining strip 40.

The ends 52 and 54 of the lateral retaining strip 50 are brought around to form a second loop, spaced apart below the first loop, in front of the inwardly facing surface 18 of the first longitudinal retaining strip 16, with the tiny loop elements 12 on the inwardly facing surface 20 of the first half length 60 of lateral retaining strip 50 overlapping and interconnecting with the tiny hook elements 10 on the outwardly facing surface 18 of the second half length 64 of retaining strip 50.

The ends of the lateral retaining strips 40 and 50 can be interconnected close to their respective outer edges with a small portion in overlapping relationship to provide a cavity 14 having a relatively large cross-sectional dimension.

The ends can be interconnected farther in from their outer edges with a relatively large portion in overlapping relationship to provide a cavity 14 having a relatively small cross-sectional dimension.

The lower end 24 of the first longitudinal retaining strip 16 and the lower end 34 of the second longitudinal retaining strip 30 are brought around to form a bottom loop facing the inwardly facing surfaces 18 of the longitudinal retaining strips 16 and 30 and facing inwardly of the cavity 14, to provide a bottom wall therefor.

The inwardly facing surface 18 of the lower end 34 of longitudinal retaining strip 30 having tiny loop elements 12 thereon is placed in overlapping relationship to the outwardly facing surface 20 of the lower end 24 of longitudinal retaining strip 16 having tiny hook elements 10 thereon, and interconnected therewith.

The ends 24 and 34 of the longitudinal retaining strips 16 and 30 can be interconnected close to their respective outer edges with only a small portion in overlapping relationship to provide a cavity 14 that has a relatively long longitudinal dimension.

The ends can be interconnected farther in from their outer edges with a relatively large portion in overlapping relationship to provide a cavity 14 that has a relatively short longitudinal dimension.

To form a waist belt loop 94, the upper end 22 of the first longitudinal retaining strip 16 is doubled back on itself in the direction faced by the outwardly facing surface 20 thereof to bring the tiny hook elements 10 thereon into facing and interconnecting relationship with the tiny loop elements 12 on the outwardly facing surface 92 of the connecting panel 90.

To form the shoulder strap loop 96, the end 76 of the first length 72 of the relatively short lateral carrier connecting strip 70 is brought around in the direction faced by the outwardly facing surface 18 of the longitudinal retaining strip 16 to overlap the end 82 of the second length 78 of the carrier connecting strip 70 when such end 82 is also brought around in the direction faced by the inwardly facing surface 20 of the longitudinal retaining strip 16. At such time, the tiny loop elements 12 on the surface 84 of the first length 72 of strip 70 are brought into facing and interconnecting relationship with the tiny hook elements on the surface 86 of the second length 78 of the carrier connecting strip 70, thus forming the shoulders strap loop 96.

The holder can be easily and quickly disassembled by merely separating the ends of the retaining strips and of the carrier connecting strips.

The entire holder 2 including the carrier connecting structure by which the holder may be connected to something else for carrying, such as a person's waist belt or shoulder strap, or the frame of a bicycle, and the like, is made of non-metallic materials. The retaining strips 8 and carrier connecting strip 70 are preferably made of flexible sheet material cut into strips and connected as described above by sewing. The tiny hook and loop connecting elements can be affixed to the strips of flexible sheet material in any of the ways known to the prior art. The tiny hook and loop connecting elements can be purchased in panels, which panels can then be sewn to the respective end regions of the flexible sheet strips to create the structure and embodiment described herein. In the alternative, each entire strip or segment thereof as described above can have the tiny hook elements 10 or the tiny loop elements 12 throughout one of the entire surfaces of such strip. Flexible sheet strips of that kind are available for purchase, having the hook and loop elements already in place thereon.

I claim:

1. A holder for a container or other article, comprising a plurality of flexible retaining strips defining a cavity having a cross-section or lateral area dimension and a length or longitudinal dimension to receive an article therein, cross-section adjusting means to make said cross-section of said cavity larger or smaller and longitudinal adjusting means to make said longitudinal dimension of said cavity longer or shorter, including carrier connecting means to connect said holder to a carrier for transport and for support, wherein said carrier connecting means includes a first elongated longitudinally extending retaining strip in said plurality of flexible retaining strips, said first elongated longitudinally extending retaining strip having an upper end and an upwardly extending loop forming portion extending inwardly from said upper end, a first releasable securing member of a first releasable securing assembly on said first elongated longitudinally extending retaining strip spaced apart inwardly of said upper end, a second releasable securing member of said releasable securing assembly adjacent said upper end of said elongated longitudinally extending retaining strip, said second releasable securing member being brought into facing and releasably securing relationship with said first releasable securing member when said loop_forming portion is formed into a first loop, said first loop being positioned to receive a carrying support member therethrough to carry and support said holder thereon, wherein said carrier connecting means includes a laterally extending carrier connecting strip extending laterally from said upwardly extending portion of first longitudinally extending retaining strip, said laterally extending carrier connecting strip having a first end and an opposite second end, said laterally extending carrier connecting strip being formable into a second loop to receive a carrying support member therethrough to carry and support said holder thereon, said first end of said laterally extending carrier connecting strip being brought into releasably securing relationship with said second end thereof when said second loop is formed, a second releasable securing assembly on said laterally extending carrier connecting strip, a first releasable securing member of said second releasable securing assembly adjacent to said first end of said laterally extending carrier connecting strip, a second releasable securing member of said second releasable securing assembly adjacent said second end of said laterally extending carrier connecting strip, said first and second releasable securing members of said second releasable securing assembly being in releasable securing engagement when said second loop has been formed.

2. A holder for a container or other article as set forth in claim 1, wherein said first loop is positioned to receive therethrough a carrying support member which extends laterally of said first elongated longitudinally extending retaining strip and of said holder, said second loop is positioned to receive therethrough a carrying support member which extends longitudinally of said first elongated longitudinally extending retaining strip and of said holder.

3. A holder for a container or other article as set forth in claim 1, wherein one of said first and second releasable securing members of each of said first and second releasable securing assemblies respectively include hook elements and the other loop elements.

* * * * *